United States Patent [19]

Shishkin et al.

[11] Patent Number: 4,745,879
[45] Date of Patent: May 24, 1988

[54] DEVICE FOR COATING THE INTERNAL SURFACE OF A PIPELINE WITH A CEMENT-SAND MIXTURE

[75] Inventors: Viktor V. Shishkin, Krasnodar; Boris I. Shlatgauer; Vladimir L. Medunitsa, both of Severo-Kazakhstanskaya, all of U.S.S.R.

[73] Assignee: Trest "Juzhvodoprovod", Krasnodar, U.S.S.R.

[21] Appl. No.: 882,888
[22] PCT Filed: Oct. 16, 1985
[86] PCT No.: PCT/SU85/00090
  § 371 Date: Jun. 9, 1986
  § 102(e) Date: Jun. 9, 1986
[87] PCT Pub. No.: WO86/02427
  PCT Pub. Date: Apr. 24, 1986

[30] Foreign Application Priority Data

Oct. 17, 1984 [SU] U.S.S.R. .............................. 3797917
Oct. 17, 1984 [SU] U.S.S.R. .............................. 3797908

[51] Int. Cl.$^4$ ..................... B05C 7/02; B05C 11/04
[52] U.S. Cl. ................................ 118/105; 118/306; 118/DIG. 10
[58] Field of Search ............. 118/306, DIG. 10, 408, 118/254, 105

[56] References Cited

U.S. PATENT DOCUMENTS 3,067,721 12/1962 Collins, Jr. ........................... 118/408
4,216,738 8/1980 Muta .................................. 118/306 X

FOREIGN PATENT DOCUMENTS 1034971 7/1966 United Kingdom ................ 118/306
1489570 10/1977 United Kingdom .
126696 10/1960 U.S.S.R. .

OTHER PUBLICATIONS

Klimovsky, Purging and Testing of Trunk Pipelines, NEDRA, Moscow 1966 (pp. 188–189) (with English translation).

Primary Examiner—John P. McIntosh
Attorney, Agent, or Firm—Lilling & Greenspan

[57] ABSTRACT

A device for coating the internal surface of a pipeline with a cement-sand mixture, includes a mechanism (1) for applying a coating, systems (2 and 3) of feeding the cement-sand mixture and the working medium, hoses (4 and 5) a pull rope (6) and a winch (7). Wound on the shaft (8) of the winch drum (7) are the pull rope (6) and the hoses (4 and 5), some ends of which pass through the cavity of the shaft (8) and communicate through the supporting assemblies (11) of the shaft with respective systems (2 and 3) for feeding the mixture and working medium, and the other ends of which are connected to the mechanism for applying a coating. A joint winding or reeling off of the hoses (4 and 5) and the pull rope (6) make it possible to substantially streamline the maintenance of the device, as well as freely pass the working medium and the cement-sand mixture and water for washing the hose (5) through the hoses.

2 Claims, 2 Drawing Sheets

DEVICE FOR COATING THE INTERNAL SURFACE OF A PIPELINE WITH A CEMENT-SAND MIXTURE

BACKGROUND OF THE INVENTION

1. Field of the Invention

The present invention relates to the maintenance of cross-country pipelines, and more particularly to a device for coating the internal surface of a pipeline with a cement-sand mixture.

2. Description of the Prior Art

Repair work at pipeline transport is becoming increasingly important in the world today. During repair or the construction of new pipelines a protective coating of a cement-sand mixture is applied on the internal surface thereof. This coating is very durable.

Most diversified equipment is used to form a coating from the cement-sand mixture (cf. e.g., Instructions on the Maintenance of the Equipment for Applying a Cement-Sand Mixture of the AMERON company, New-York Publishers, 1978, pp. 548–601).

To apply the cement-sand mixture on the inside of a pipeline use is made of a device, comprising a mechanism for applying the mixture on the pipeline surface, a system for feeding the mixture to the said mechanism, a compressor for imparting rotation to the working member of the application mechanism and a pull winch.

The cement-sand mixture application mechanism is connected by a wire rope with the pull winch, and by hoses—with the compressor and the mixture feed system. The mixture feed system and the compressor are fitted with electric motors and drums.

As the wire rope and hoses leave the pipeline, the hoses are disconnected from the rope and manually placed near the pipeline.

Once the coating has been applied, the application mechanism with the hoses and the rope are removed from the pipeline, the mixture feed hoses are disconnected from the rope and washed with water. Thereafter, the rope and the hoses are wound on respective drums.

This sequence of operations prolongs the entire technological cycle of applying the coating on the internal surface of the pipeline and increases the expenditure of manual labour and requires numerous service personnel. Besides, in case of sudden stoppages of the device, the cement-sand mixture is likely to solidify in the hoses.

SUMMARY OF THE INVENTION

The present invention is aimed at solving the problem of developing the device for coating the internal surface of the pipeline with the cement-sand mixture, wherein the mixture feed hoses and the pull hose are wound in such a way as to preclude the sequence of winding and placing them, as well as to reduce the amount of equipment used for coating, decrease labour costs and the service personnel.

The aforementioned problem is solved by the invention by the use of the device for coating the internal surface of the pipeline with the cement-sand mixture, comprising a mixture-application mechanism, systems for feeding the mixture and the working medium connected by hoses with the coating application mechanism, a pull rope secured in the winch drum, wherein, according to the invention, the hoses for feeding the mixture and the working medium together with the rope are wound on the winch drum and are passed by their ends through the drum shaft which is made hollow and at the ends has immovably mounted assembles communicating the mixture and the working medium feed systems with the respective hoses.

The winding of the rope and the hoses onto one drum makes it possible to reduce the amount of equipment and increases the device capacity, as well as completely eliminates manual labour necessary for connecting and disconnecting the hoses from the rope and placing the hoses near the pipeline, since it is particularly difficult to place the hoses filled with the cement-sand mixture.

Making the shaft hollow and the availability of supporting assemblies at its ends which communicate with a respective mixture feed system enables the device, as the drum rotates, to feed the mixture and the working medium (compressed air) through the hoses. Therefore, the hoses and the rope and wound on one drum of the winch simultaneously.

It is expedient that hermetic chambers be made at the shaft ends which communicate with the ends of the hoses and accommodate supporting assemblies, each of which has an axle with a packing element and a central duct which is mounted on bearings, said duct being coaxial with the hose and communicating, on the one hand, with the chamber and, on the other hand, with a respective system.

This enables one to use the axles as racks and elements feeding the mixture to the hose as the drum rotates.

The supporting assembly may communicate with the mixture feed system via a branch pipe having a chamber accommodating an elastic plug, the chamber cavity beyond the plug communicating with the working medium feed system.

The availability of the branch pipe with the chamber accommodating the elastic plug makes it possible to remove the mixture from the hoses immediately after the feed system stops operating.

The communication of the chamber cavity beyond the elastic plug with the working medium feed system helps automate the process of cleaning the hose. The latter is cleaned right after turning off the mixture feed system.

BRIEF DESCRIPTION OF THE DRAWINGS

The invention will be more apparent upon considering a detailed description of the device, references being made to the accompanying drawings, wherein.

DESCRIPTION OF THE PREFERRED EMBODIMENT

Figure 1:
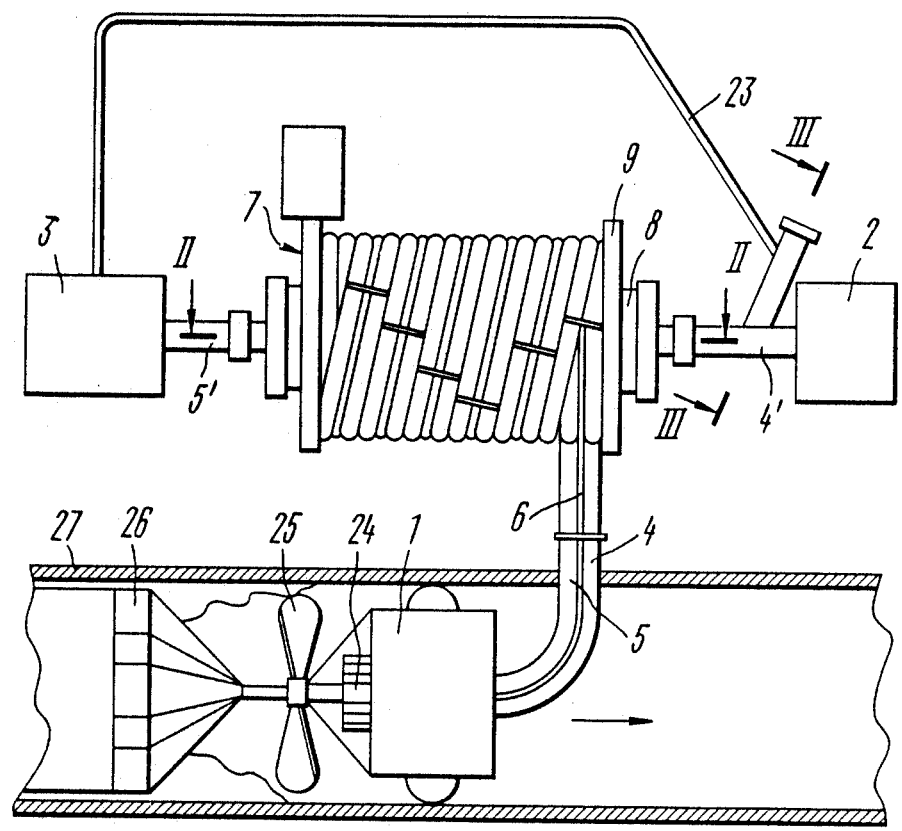
FIG. 1 is a schematic view of the device for coating the internal surface of the pipelines with the cement-sand mixture.

The device for coating the internal surface of the pipeline with the cement-sand mixture comprises a mechanism 1 for applying the cement-sand mixture, systems 2 and 3 for feeding the cement-sand mixture and the working medium (air), respectively, which are connected by means of hoses 4 and 5 with the mechanism 1 for applying the mixture, a pull rope 6 and a winch 7.

A shaft 8 (FIG. 2) of a drum 9 of the winch 7 is made hollow and at the ends has hermetic chambers 10 and immovably mounted supporting assemblies 11 communicating the systems 2 and 3 of feeding the mixture and working medium, respectively, with the corresponding hoses 4 and 5.

The supporting assemblies 11 are arranged in hermetic chambers 10 communicating with the ends of the hoses 4 and 5. The hoses 4 and 5 are reinforced or armor-clad so that they are not flattened as they are wound on the drum.

Each of the supporting assemblies 11 has an axle 13 with a packing element 14 sealing the chamber 10. The axle 13 is mounted on bearings 12. From the side opposite to the arrangement of the chamber 10, the supporting assemblies 11 have a cover 15 screwed on the ends of the shaft 8.

Figure 2:
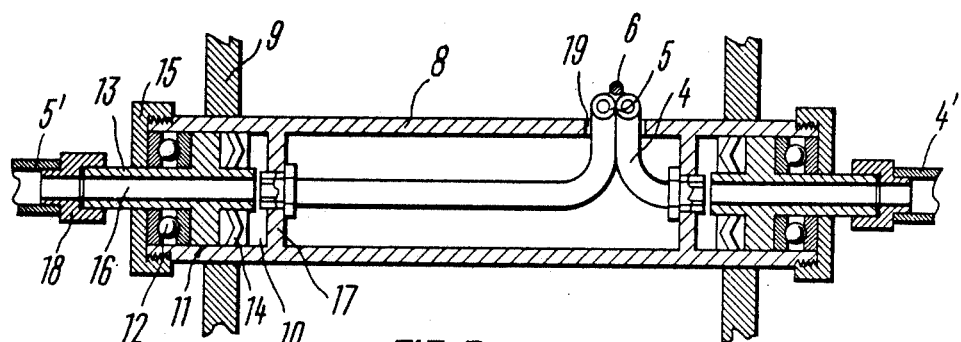
FIG. 2 is a cross-sectional view taken along II—II as in FIG. 1.

Each axle 13 passes by its ends through the packing element 14 and the cover 15. In the axles 13 there is made a central duct 16 coaxial with the ends of the hoses secured in jumpers 17 of the hollow shaft 8 separating the chambers 10 from the cavity of the shaft. The central duct 16 of the axles 13 communicates, on the one hand, with the hermetic chamber 10 and, on the other hand, with a respective system of feeding the mixture and the working medium via hoses 4' and 5', said hoses 4' and 5' of the system being connected to the axles 13 by means of threaded sleeves 18, as is shown in FIG. 2.

In the body of the shaft 8 of the drum 9 there is made a hole 19 through which the ends of the hoses 4 and 5 for feeding the mixture and the working medium are passed and secured in a prior art manner in the jumpers 17. Owing to such an embodiment of the shaft 8 of the winch 7 the hoses 4 and 5 of feeding the mixture and the working medium, respectively, are wound on or reeled off this shaft 8 simultaneously alongside the rope 6 whose one end is secured on the shaft 8 of the drum 9 in a conventional manner, and the other end is fixed to the mechanism 1 for applying the mixture.

To wash the hose 4 (FIG. 3) wound on the shaft 8 of the drum of the winch 7, the supporting assembly 11 communicates with the system 2 for feeding the mixture through the hose 4' and branch pipe 20 having a chamber 21 accommodating an elastic plug 22 therein. The cavity of the chamber 21 beyond the plug 22 communicates with the system 3 of feeding the working medium by means of an additional hose 23.

Used as the mechanism 1 (FIG. 1) for applying the cement-sand mixture is any prior art mechanism, containing, e.g., a pneumatic turbine 24 whose blades 25 throw about the cement-sand mixture on the internal surface of the pipeline. Arranged beyond the blades 25 is a cone 26 smoothing out the cement-sand mixture applied on the surface of the pipe and which is connected to the mechanism 1 by a flexible bond.

The cement-sand mixture feed system 2 comprises a prior art pump suitable for pumping the mixture, and the working medium (air) feed system 3 contains a prior art air compressor.

The disclosed device operates as follows.

Wound on the drum 9 (FIG. 1) of the winch 7 are the hoses 4 and 5 for feeding the cement-sand mixture and the working medium (air), respectively, which are secured to the pull rope 6 by means of tie pieces, as is shown in FIG. 1. The system 2 feeds the cement-sand mixture along the hose 4 to the mechanism 1 arranged in a pipeline 27 and used to apply the cement-sand mixture on the inside of the pipeline. From the system 2 the mixture is fed along the hose 4' to the central duct 16 of the axle 13 and then to the chamber 10 from which it is forced out to the hose 4 secured in the jumper 17. As the rope 6 and hoses 4 and 5 are reeled off or wound on the drum 9, the latter rotates on the bearing 12 around the axles 13 which remain motionless. The cement-sand mixture is fed to the blades 25 of the turbine 24 which rotates by the working medium (air) being fed through the hose 5 from the system 3, and owing to a centrifugal force the cement-sand mixture is thrown about the internal surface of the pipeline.

Figure 3:
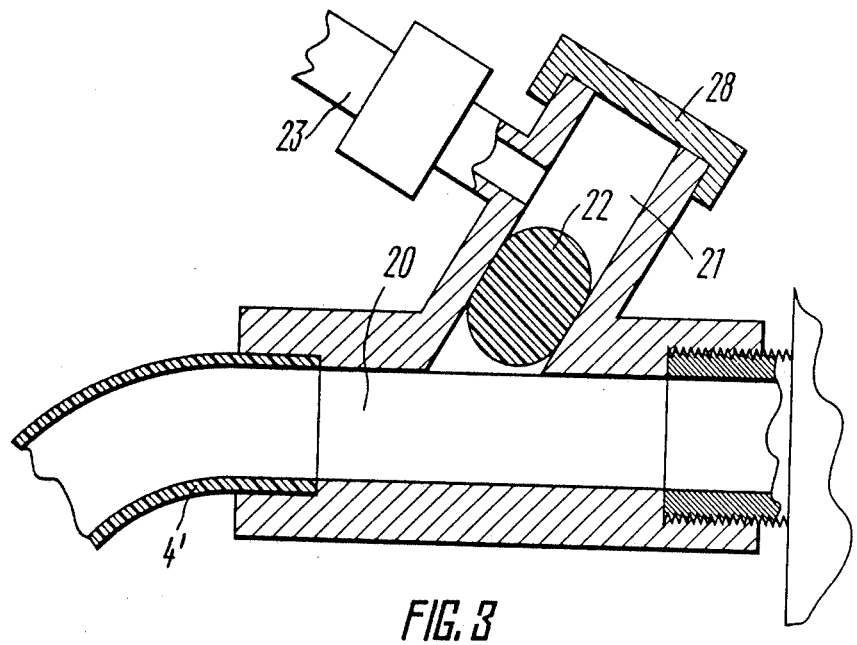
FIG. 3 is a cross-sectional view taken along III—III as in FIG. 1.

The cone 26 smoothes down the cement-sand mixture sprayed on the pipeline wall. The winch 7 rotates the drum 9 which winds the rope 6 with the hoses 4 and 5 on itself and moves the mechanism 1 along the pipeline. Once the mechanism 1 has left the pipeline or halts for a certain reason, the mixture feed along the hose is terminated. As a result the pressure of the cement-sand mixture declines before the plug 22 (FIG. 3). Owing to an excess pressure of the air being fed along the hose 23 to the chamber 21, the plug 22 starts moving along the hose 4, removing the remainder of the cement-sand mixture therefrom. Upon leaving the hose 4, the plug 22 is again installed in the chamber 21 having removed the cover 28. Once the remainder of the cement-sand mixture has been removed from the hose 4, the latter is washed with water by a prior art manner. Because the hose 4 is reinforced, the plug 22 and the mixture freely pass along it, as they are wound on the drum.

The invention may be used in public, agricultural, industrial, land reclamation water supply and in the pipelines pumping oil, gas and other chemical products, for the protection of pipelines under construction against corrosion and restoration of the operating pipelines.

What we claim is:

1. A device for coating the internal surface of a pipeline with a cement-sand mixture, comprising a coating application mechanism (1); systems (2 and 3) for feeding the cement-sand mixture and a working medium, respectively, connected by hoses (4 and 5) to said coating application mechanism (1); a winch having a shaft (8) and a drum (9) on said shaft; a pull rope (6) secured on said drum of said winch (7), said hoses (4) and (5) for feeding the mixture and the working medium being wound together with said rope (6) on said shaft (8) of said drum of said winch (7) and having their ends passing through said shaft (8) of said drum which is hollow, characterized in that hermetic chambers (10) communicating with the ends of said hoses (4 and 5) are provided at the ends of said shaft (8) and said chambers (10) accommodate supporting assemblies (11), each of which has an axle (13) mounted in bearings (12) and having a packing element (14) and a central duct (16) coaxial with said hose and communicating, at one side, with said chamber (10) and, at the other side, with a corresponding system.

2. A device, as claimed in claim 1, characterized in that a supporting assembly is provided which communicates with the system of feeding the mixture through a branch pipe having a chamber with an elastic plug arranged therein, said chamber beyond said plug having a cavity communicating with the working medium feed system.

* * * * *